United States Patent
Yin et al.

(10) Patent No.: US 8,429,640 B2
(45) Date of Patent: Apr. 23, 2013

(54) SYSTEM AND METHOD FOR MODIFYING FIRMWARE

(75) Inventors: Jianwen Yin, Round Rock, TX (US); Haihong Zhuo, Austin, TX (US); Mohammad Dhedhi, Round Rock, TX (US); Xianghong Qian, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 923 days.

(21) Appl. No.: 12/478,875

(22) Filed: Jun. 5, 2009

(65) Prior Publication Data

US 2010/0313191 A1 Dec. 9, 2010

(51) Int. Cl.
*G06F 9/45* (2006.01)

(52) U.S. Cl.
USPC ......................................................... 717/168

(58) Field of Classification Search .................... 717/168
See application file for complete search history.

(56) References Cited

U.S. PATENT DOCUMENTS

| | | |
|---|---|---|
| 5,835,761 A | 11/1998 | Ishii et al. |
| 5,859,911 A | 1/1999 | Angelo et al. |
| 5,909,592 A | 6/1999 | Shipman |
| 5,964,873 A | 10/1999 | Choi |
| 6,138,233 A | 10/2000 | Lim |
| 6,167,567 A | 12/2000 | Chiles et al. |
| 6,175,919 B1 | 1/2001 | Ha |
| 6,282,643 B1 | 8/2001 | Cromer et al. |
| 6,282,647 B1 | 8/2001 | Leung et al. |
| 6,438,688 B1 | 8/2002 | Nunn |
| 6,457,076 B1 | 9/2002 | Cheng et al. |
| 6,542,943 B2 | 4/2003 | Cheng et al. |
| 6,581,159 B1 | 6/2003 | Nevis et al. |
| 6,594,757 B1 | 7/2003 | Martinez |
| 6,725,178 B2 | 4/2004 | Cheston et al. |
| 6,732,267 B1 | 5/2004 | Wu et al. |
| 6,757,838 B1 | 6/2004 | Chaiken et al. |
| 6,804,773 B1 | 10/2004 | Grigsby et al. |
| 6,941,452 B2 | 9/2005 | Huang |
| 6,971,095 B2 | 11/2005 | Hirai et al. |
| 6,986,034 B2 | 1/2006 | Tyner et al. |
| 6,990,577 B2 | 1/2006 | Autry |
| 6,993,650 B2 | 1/2006 | Landers, Jr. et al. |

(Continued)

FOREIGN PATENT DOCUMENTS

| | | |
|---|---|---|
| GB | 02375411 A | 11/2002 |
| GB | 02379761 A | 3/2003 |
| WO | 0241147 A1 | 5/2002 |

*Primary Examiner* — Henry Tsai
*Assistant Examiner* — Eric Oberly
(74) *Attorney, Agent, or Firm* — Baker Botts L.L.P.

(57) ABSTRACT

A system and method for updating software in an information handling system are disclosed. One or more relationships between a firmware package and a set of components associated with the information handling system are generated. A first storage partition identifier is generated based, at least in part, on the relationships. A second storage partition identifier generate is based, at least in part, on one or more parameters of the set of components, where the second storage partition identifier is associated with the first storage partition identifier. A first storage partition having the first storage partition identifier is generated. A second storage partition having the second storage partition identifier is generated. A copy of the firmware information is stored so that the firmware information is associated with the second storage partition. Firmware for at least one of the set of components is modified based, at least in part, on firmware information.

11 Claims, 10 Drawing Sheets

U.S. PATENT DOCUMENTS

| | | |
|---|---|---|
| 7,000,101 B2 | 2/2006 | Wu et al. |
| 2003/0023966 A1 | 1/2003 | Shimizu et al. |
| 2004/0024399 A1 | 2/2004 | Sharps et al. |
| 2004/0024917 A1 | 2/2004 | Kennedy et al. |
| 2004/0215755 A1 | 10/2004 | O'Neill |
| 2004/0230963 A1 | 11/2004 | Rothman et al. |
| 2005/0071385 A1 | 3/2005 | Rao |
| 2005/0081024 A1 | 4/2005 | Khatri et al. |
| 2005/0155029 A1 | 7/2005 | Nguyen et al. |
| 2005/0268296 A1 | 12/2005 | Marolia et al. |
| 2006/0258344 A1 | 11/2006 | Chen |
| 2008/0028385 A1 | 1/2008 | Brown et al. |
| 2008/0320110 A1* | 12/2008 | Pathak .......................... 709/220 |

* cited by examiner

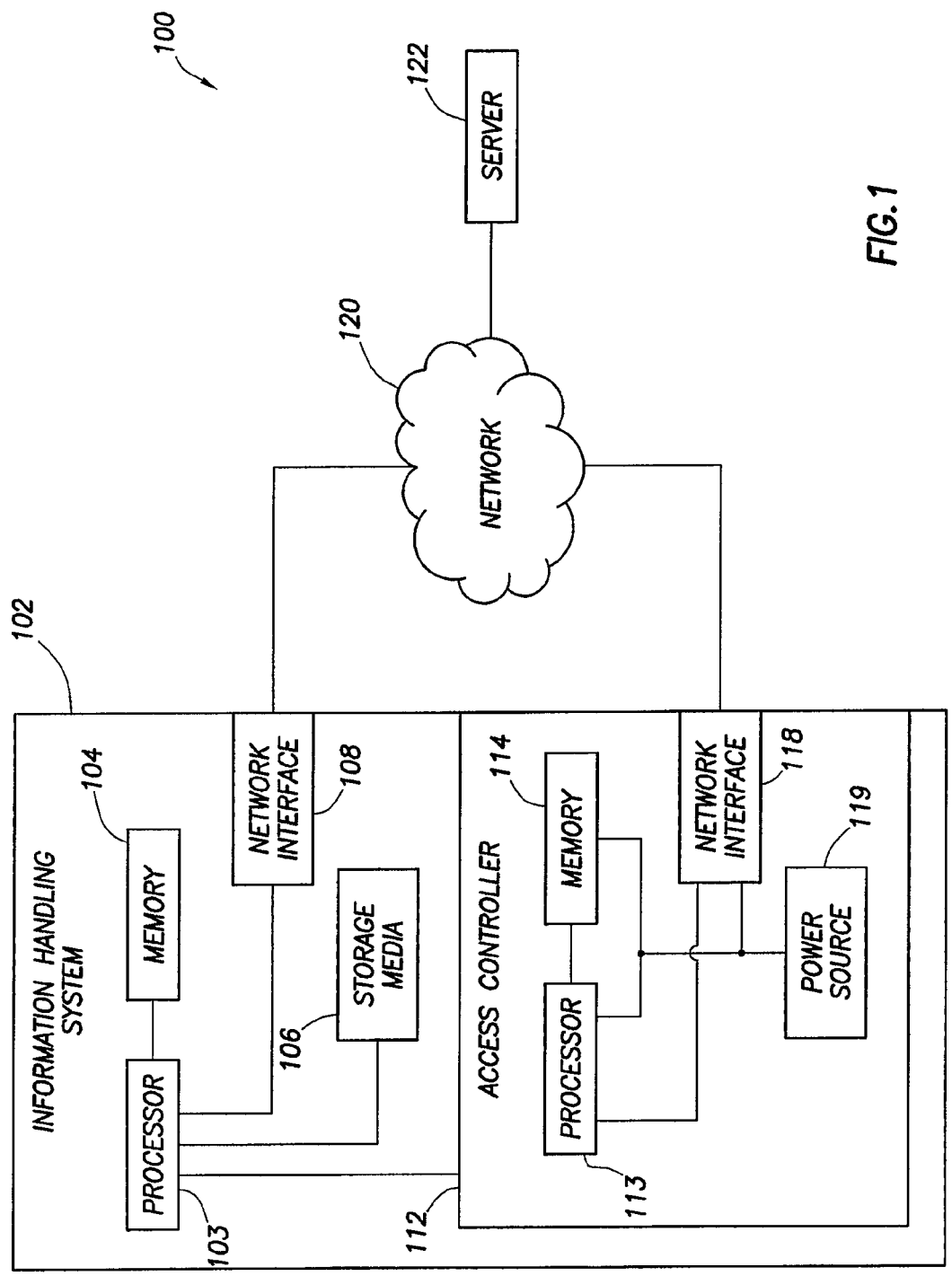

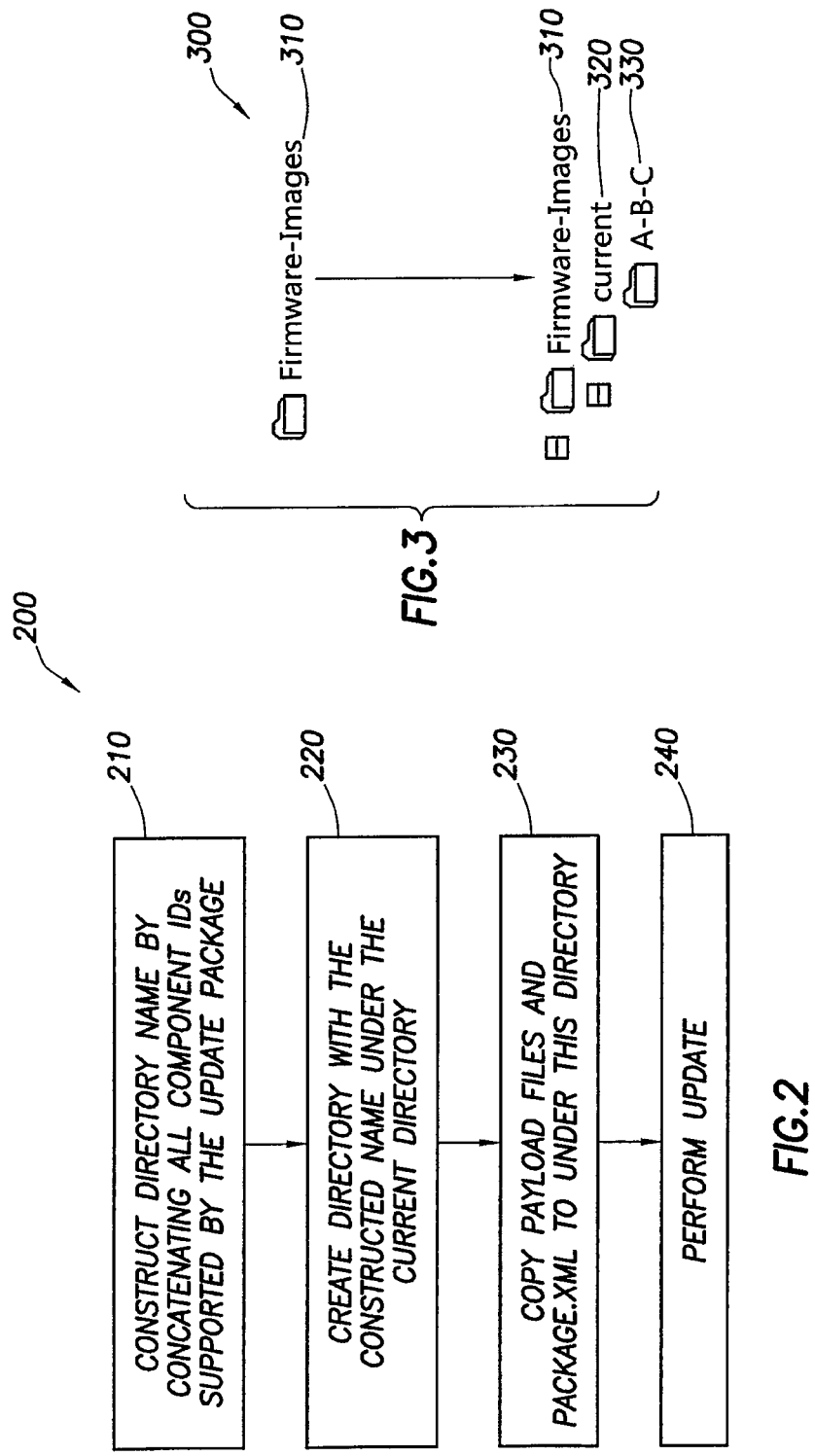

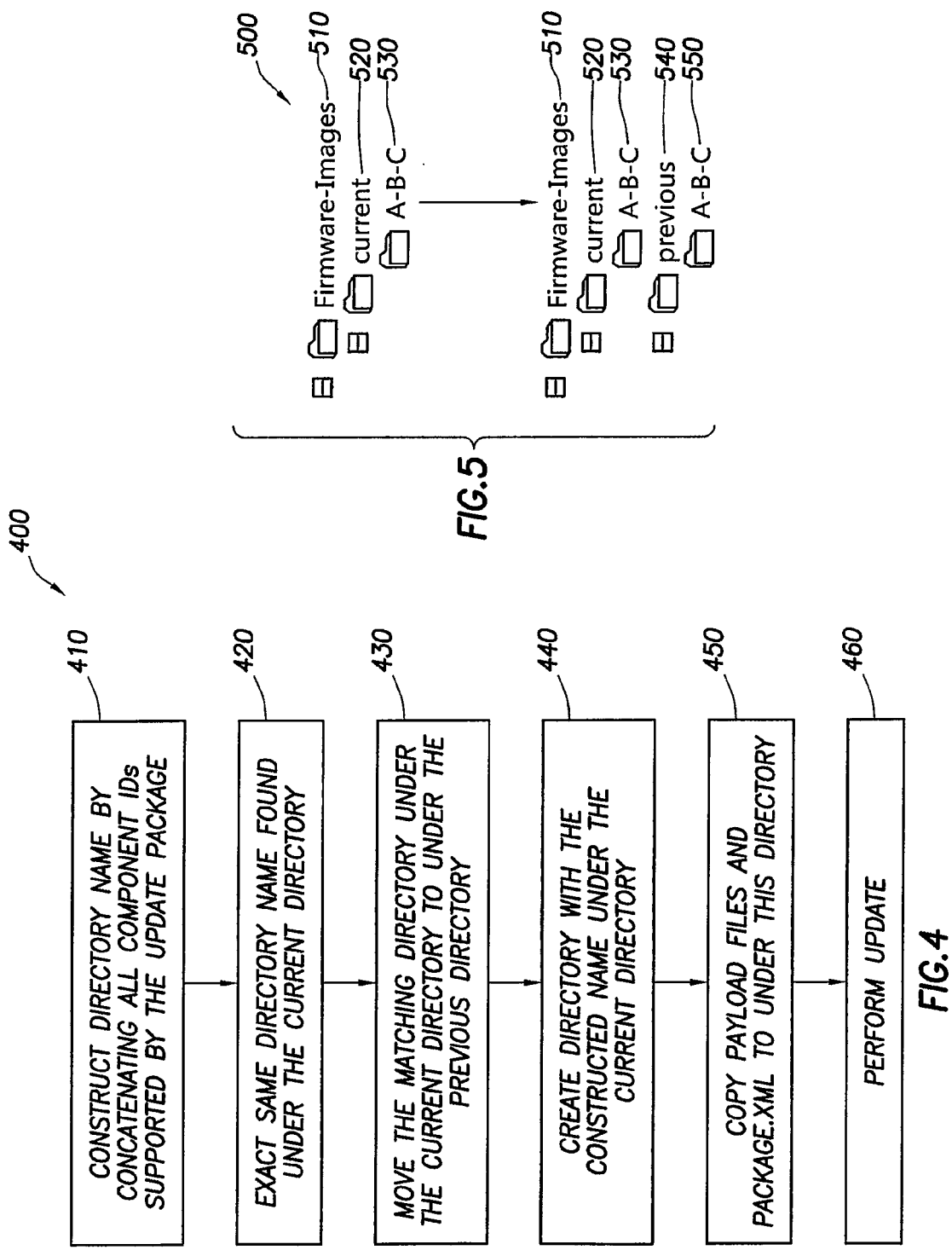

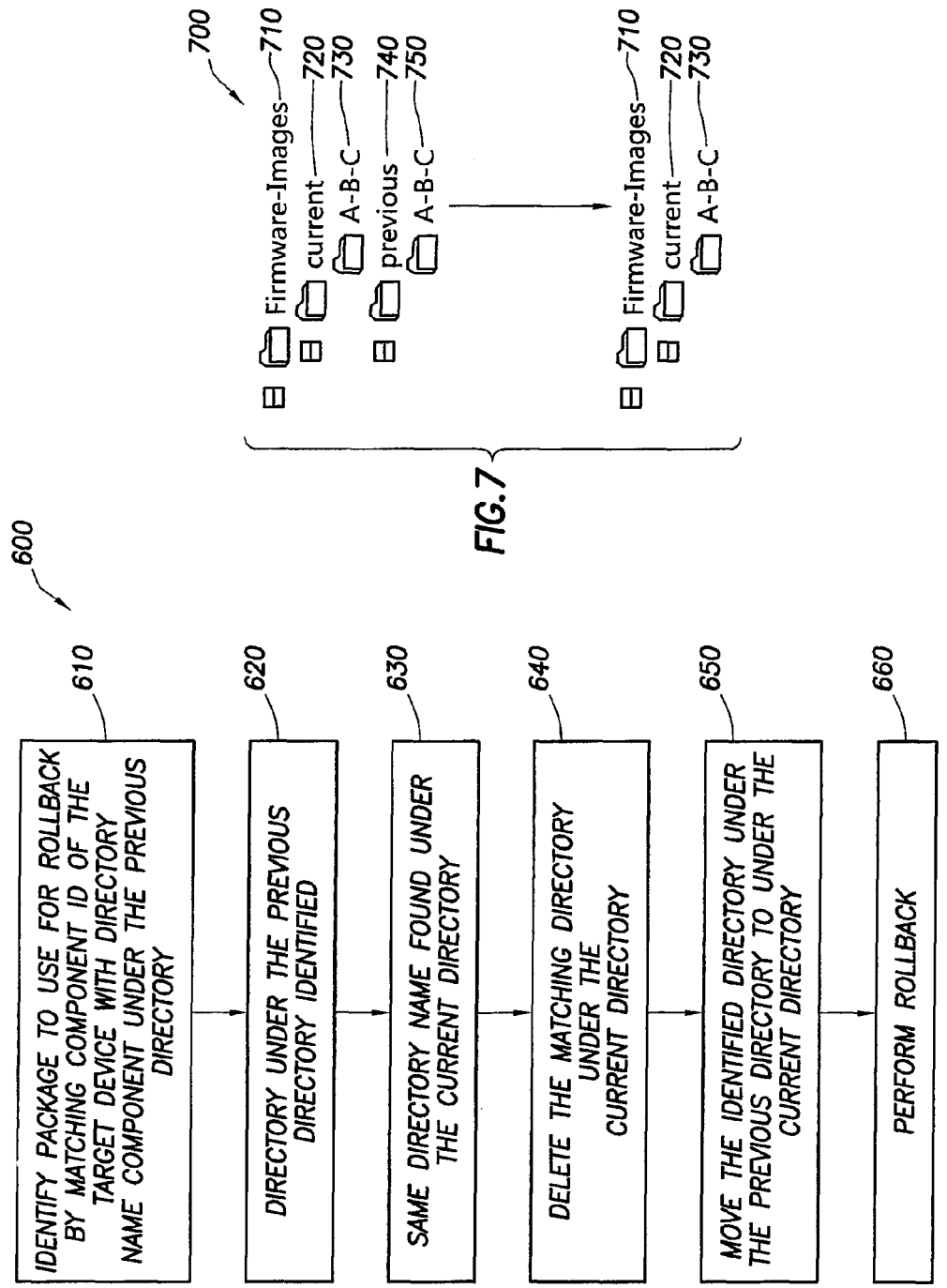

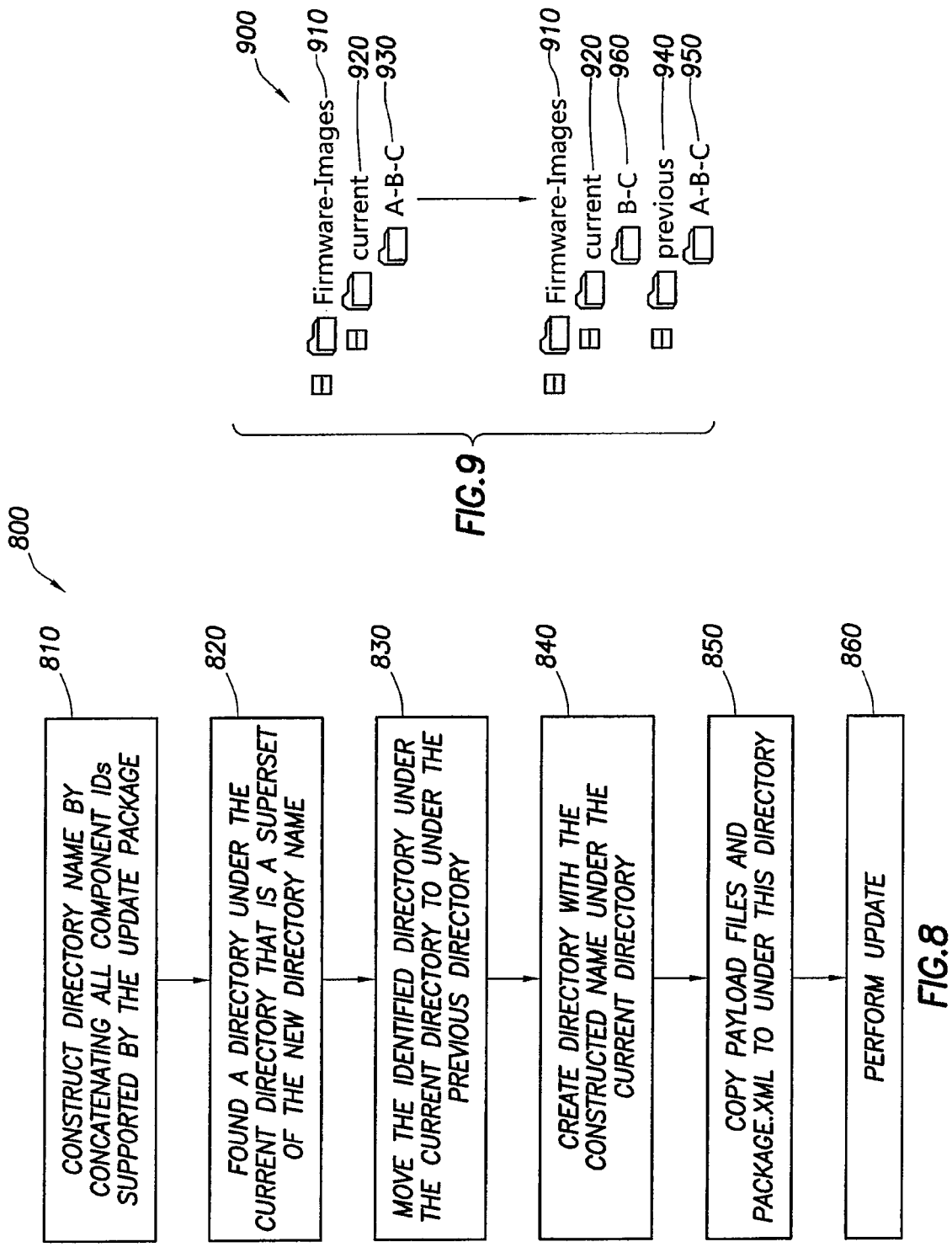

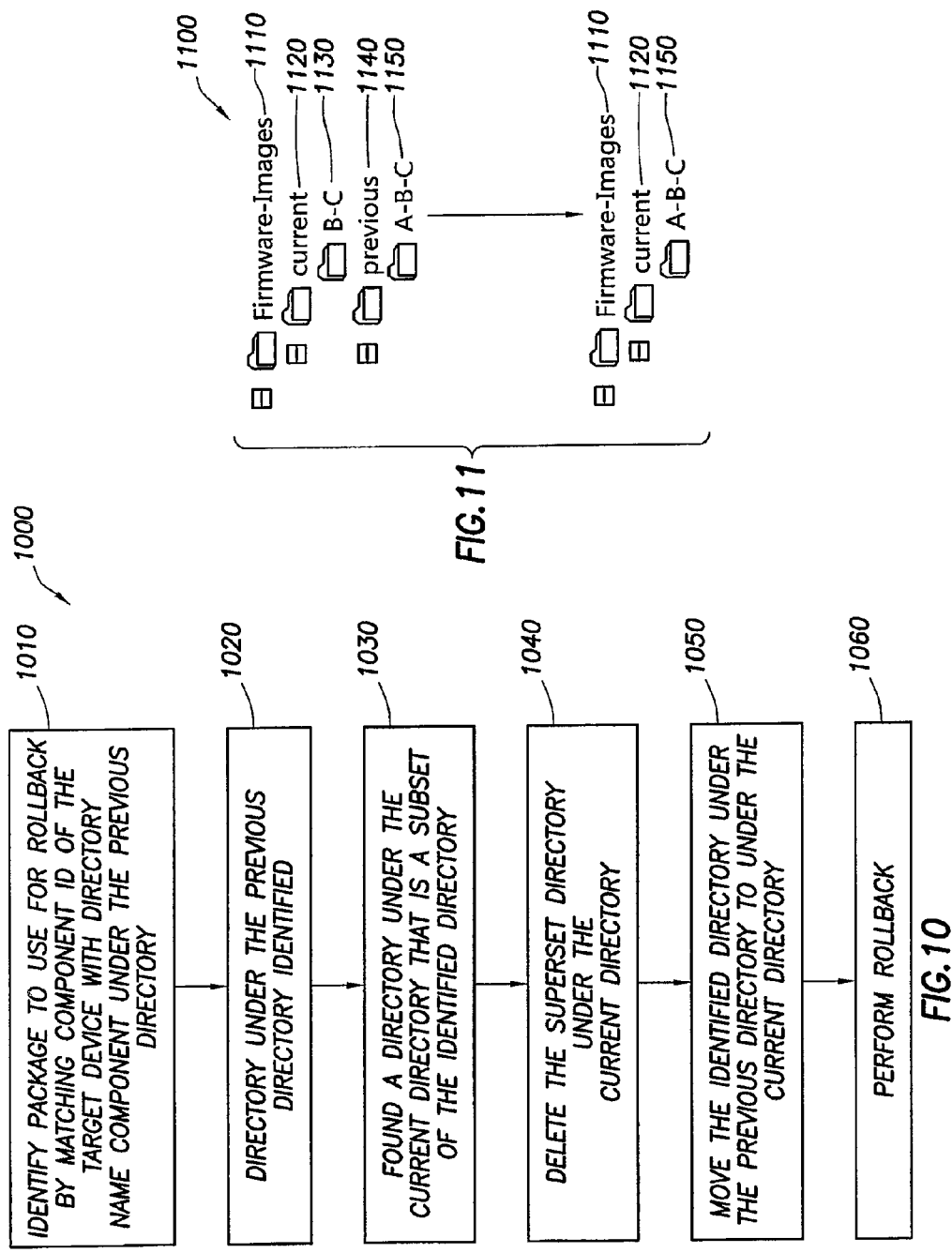

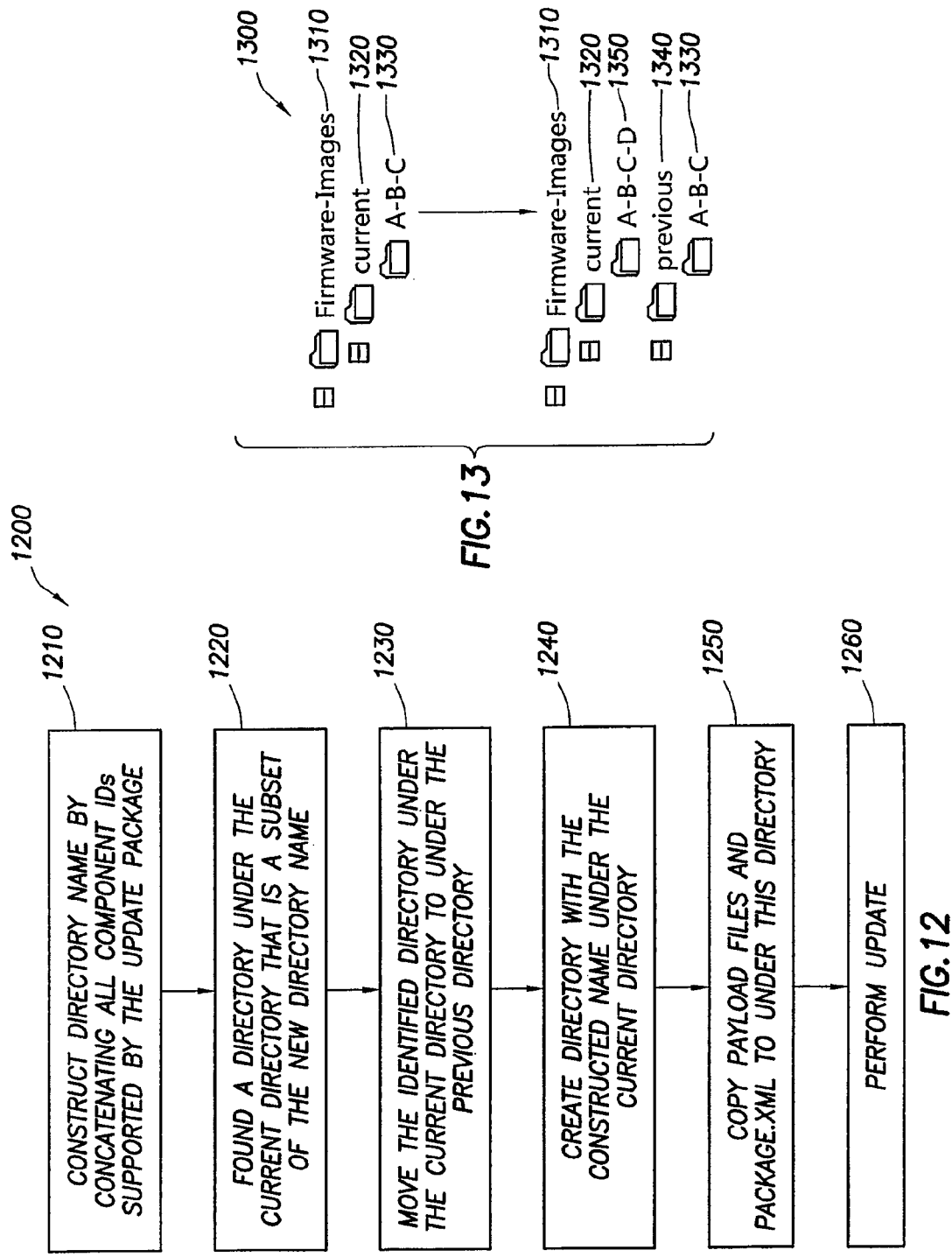

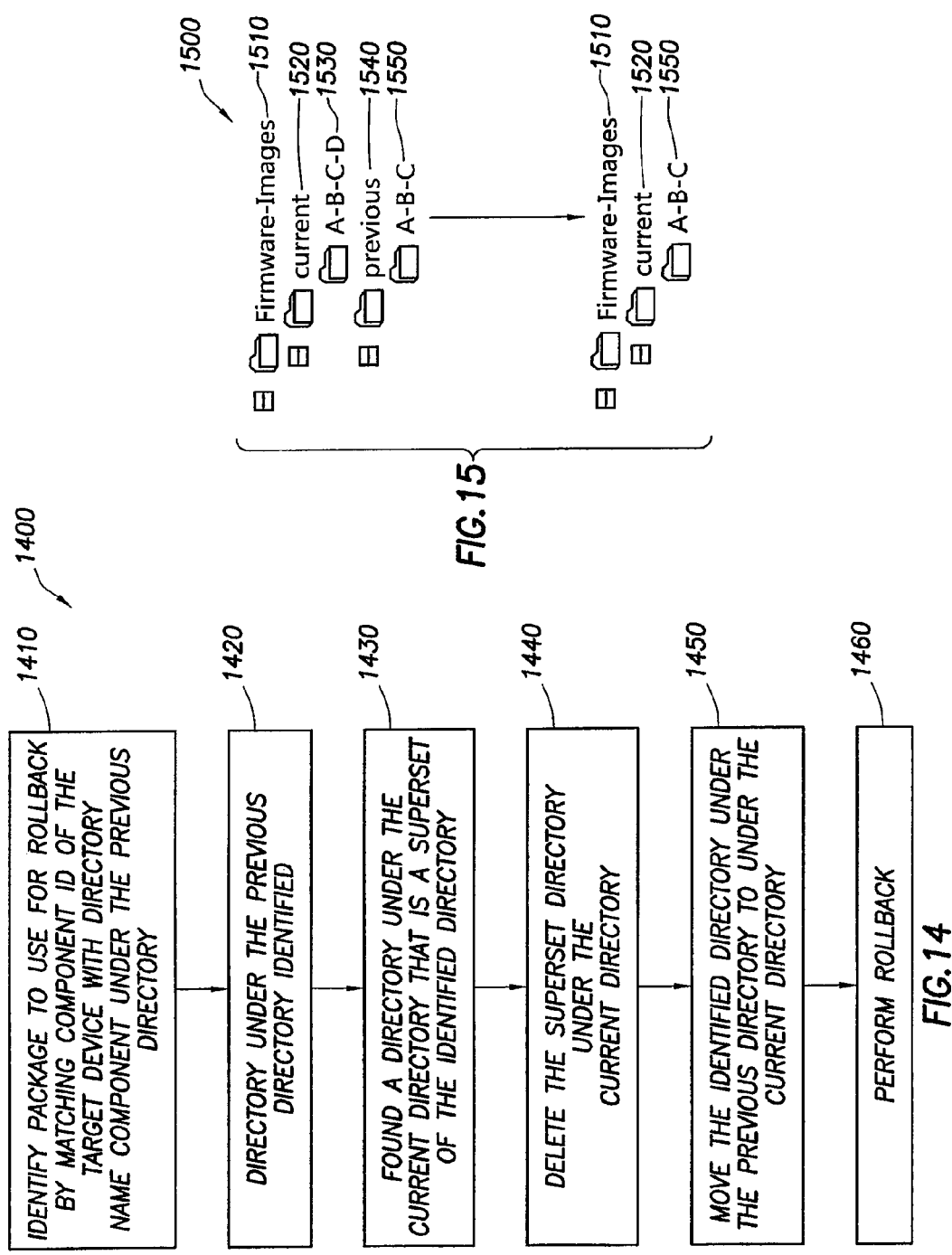

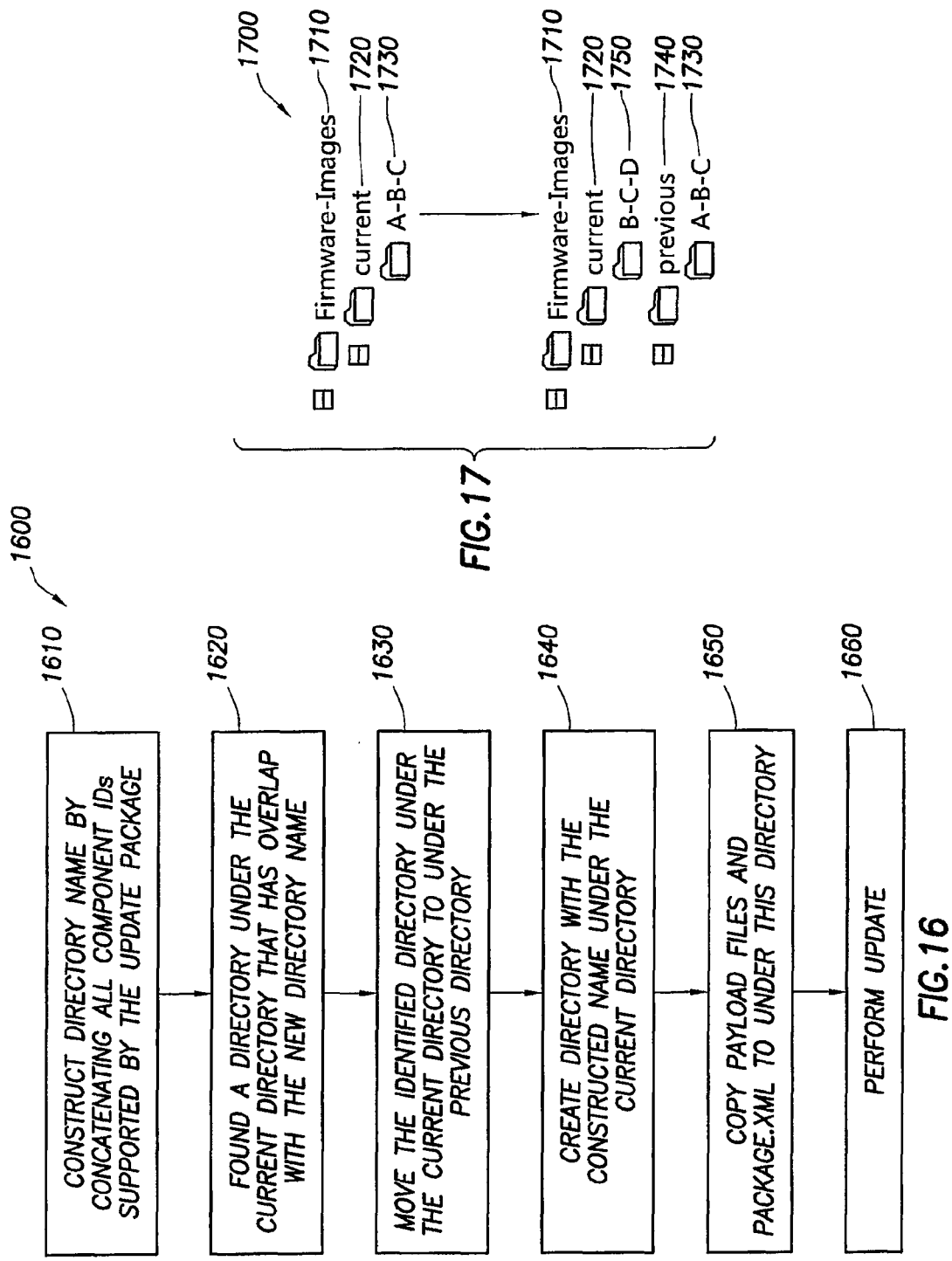

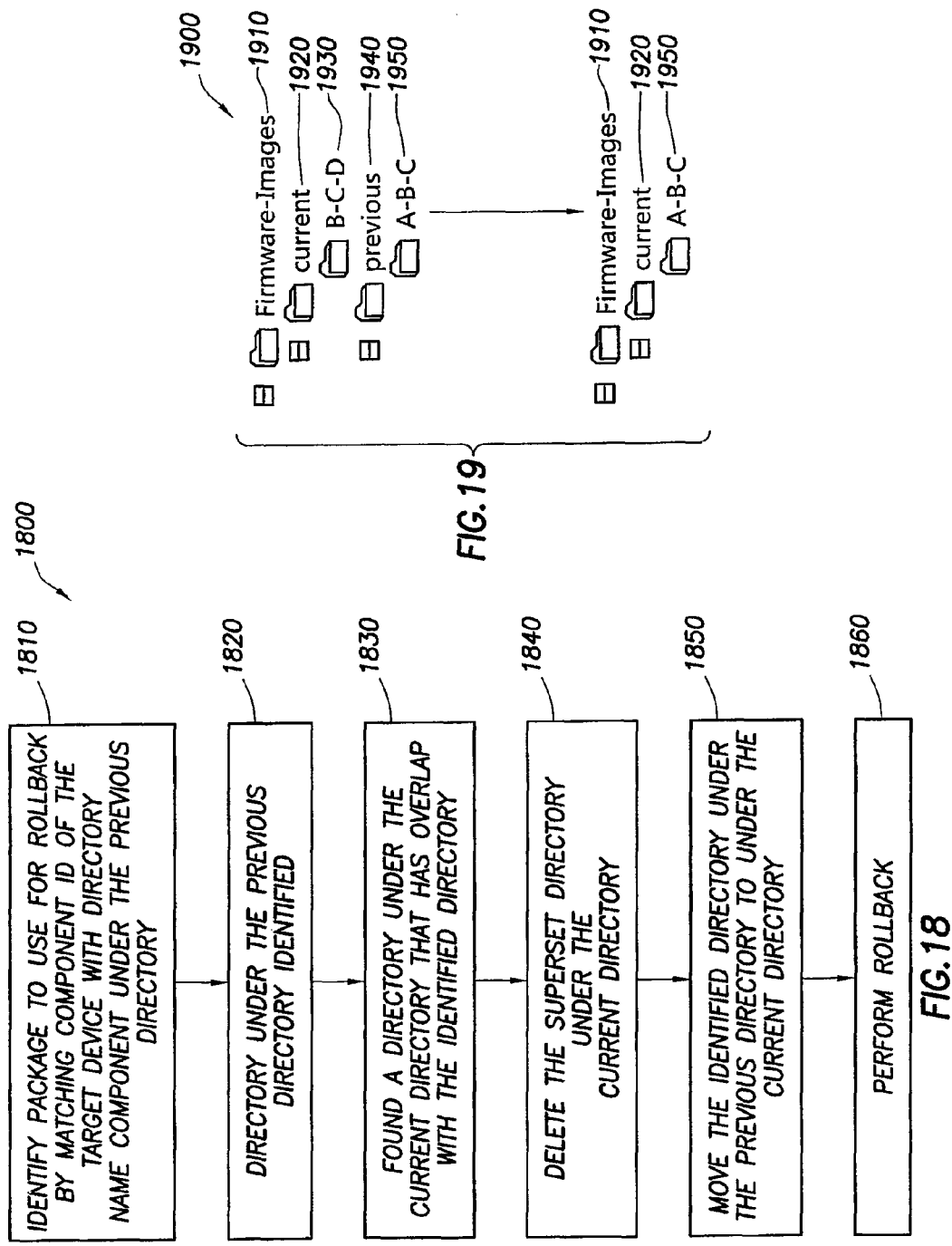

SYSTEM AND METHOD FOR MODIFYING FIRMWARE

TECHNICAL FIELD

The present disclosure relates generally to information handling systems and, more particularly, to a system and method for updating software, such as firmware, drivers, and the like.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

Examples of information handling systems, such as computers, including servers and workstations, are often grouped in clusters to perform specific tasks. Many information handling systems include one or more components that process and/or operate based on firmware embedded in or near the component. These components may be coupled with controllers driven by firmware. Firmware may be program code embedded in a storage device and maintained within or near the component. The firmware for a component often comprises operational code for the component. From time to time, it may be necessary and/or desirable to update or upgrade the firmware of a component of the information handling system. For example, a firmware upgrade may be necessary to correct errors in, and/or improve the performance of, a device.

The firmware and/or the driver update process is an important element of the overall system life cycle management of information handling systems generally. Among the problems encountered are that the applicability of the updates varies from component to component and from vendor to vendor. Furthermore, hardware applicability rules are defined and implemented through programming that varies from vendor to vendor and is very difficult to maintain. Further compounding such problems is the need to provide for efficient updates for multiple devices in environments where resources such as space and memory are constrained.

SUMMARY

In accordance with the present disclosure, a system, method, and computer program for modifying software in an information handling system are disclosed. In one aspect, one or more relationships between a firmware package and a set of components in the information handling system are determined, wherein the firmware package comprises firmware information for the set of components. A first storage partition identifier is generated based, at least in part, on the one or more relationships. A second storage partition identifier is generated based, at least in part, on one or more parameters of each component, wherein the second storage partition identifier is associated with the first storage partition identifier. A first storage partition is generated, wherein the first storage partition identifier identifies the first storage partition. A second storage partition is generated, wherein the first storage partition identifier identifies the first storage partition. A copy of the firmware information is stored so that the firmware information is associated with the second storage partition. Firmware for at least one of the set of components is modified based, at least in part, on the firmware information.

The invention disclosed herein is technically advantageous because it provides a complete solution to performing firmware updates and rollbacks for multiple devices in environments where resources such as space and memory are constrained. Another advantage is the provision of an efficient mechanism for managing updates and rollbacks that may vary from component to component and from vendor to vendor. Another advantage is a unique directory structure that enables use of memory/storage with a small footprint. Advantages also include enabling correlation of a device directory structure with the update package when a single update package could support multiple devices, correlation of device rollback with the device directory structure to support rollback, and efficient location of previous versions of update packages to support rollback. Other technical advantages will be apparent to those of ordinary skill in the art in view of the following specification, claims and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 is a block diagram showing an information handling system, according to teachings of the present disclosure;

FIG. 2 is a process flow diagram illustrating initialization for generating an initial directory structure;

FIG. 3 shows a graphical view of a file structure for an exemplary firmware image repository directory initialization;

FIG. 4 is a process flow diagram illustrating an update in accordance with certain embodiments of the present disclosure;

FIG. 5 is a graphical view of a file structure for an exemplary firmware image repository directory before and after an update;

FIG. 6 is a process flow diagram illustrating a rollback in accordance with certain embodiments of the present disclosure;

FIG. 7 is a graphical view of a file structure for an exemplary firmware image repository directory before and after a rollback;

FIG. 8 is a process flow diagram illustrating an update in accordance with certain embodiments of the present disclosure;

FIG. 9 is a graphical view of a file structure for an exemplary firmware image repository directory before and after an update;

FIG. 10 is a process flow diagram illustrating a rollback in accordance with certain embodiments of the present disclosure;

FIG. 11 is a graphical view of a file structure for an exemplary firmware image repository directory before and after a rollback;

FIG. 12 is a process flow diagram illustrating an update in accordance with certain embodiments of the present disclosure;

FIG. 13 is a graphical view of a file structure for an exemplary firmware image repository directory before and after an update;

FIG. 14 is a process flow diagram illustrating a rollback in accordance with certain embodiments of the present disclosure;

FIG. 15 is a graphical view of a file structure for an exemplary firmware image repository directory before and after a rollback;

FIG. 16 is a process flow diagram illustrating an update in accordance with certain embodiments of the present disclosure;

FIG. 17 is a graphical view of a file structure for an exemplary firmware image repository directory before and after an update;

FIG. 18 is a process flow diagram illustrating a rollback in accordance with certain embodiments of the present disclosure; and FIG. 19 is a graphical view of a file structure for an exemplary firmware image repository directory before and after a rollback.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Illustrative embodiments of the present invention are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates a block diagram of an example system 100 with an information handling system 102, in accordance with certain embodiments of the present disclosure. As depicted in FIG. 1, system 100 may include an information handling system 102, a network 120, and one or more servers 122. Information handling system 102 may generally be operable to receive data from and/or communicate data to one or more other information handling systems via network 120. In certain embodiments, information handling system 102 may be a server. In another embodiment, information handling system 102 may be a personal computer (e.g., a desktop computer or a portable computer). As depicted in FIG. 1, information handling system 102 may include a processor 103, a memory 104 communicatively coupled to processor 103, storage media 106 communicatively coupled to processor 103, a network interface 108 communicatively coupled to processor 103, and an access controller 112 coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage media 106 and/or another component of information handling system 102.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. Storage media 106 may include computer-readable media (e.g., hard disk drive, floppy disk drive, CD-ROM, and/or other type of rotating storage media, flash memory, EEPROM, and/or other type of solid state storage media) and may be generally operable to store data and/or programs (e.g., one or more operating systems and/or one or more application programs).

Network interface 108 may include any suitable system, apparatus, or device operable to serve as an interface between information handling system 102 and network 120. Network interface 108 may enable information handling system 102 to communicate over network 120 using any suitable transmission protocol and/or standard, including without limitation all transmission protocols and/or standards enumerated below with respect to the discussion of network 120. In certain embodiments, network interface 108 may be configured with hardware, software, and/or firmware to allow its associated information handling system 102 to remotely boot from a computer-readable medium remote from information handling system 102 (e.g., a computer-readable medium coupled to network interface 108 via network 120).

Access controller 112 may be any system, device, apparatus or component of information handling system 102 configured to permit an administrator or other person to remotely monitor and/or remotely manage information handling system 102 (e.g., via an information handling system remotely connected to information handling system 102 via network 120) regardless of whether information handling system 102 is powered on and/or has an operating system installed thereon. In certain embodiments, access controller 112 may allow for "out-of-band" control of information handling system 102, such that communications to and from access controller 112 are communicated via a management channel physically isolated from the "in band" communication with network interface 108. Thus, for example, if a failure occurs in information handling system 102 that prevents an administrator from remotely accessing information handling system 102 via network interface 108 (e.g., operating system failure, power failure, etc.), the administrator may still be able to monitor and/or manage the information handling system 102 (e.g., to diagnose problems that may have caused failure) via access controller 112. In the same or alternative embodiments, access controller 112 may allow an administrator to remotely manage one or more parameters associated with operation of information handling system 102 (e.g., power usage, processor allocation, memory allocation, security privileges, etc.). In certain embodiments, access controller 112 may include or may be an integral part of a Dell Remote Access Controller (DRAC) or an Integrated Dell Remote Access Controller (iDRAC).

As depicted in FIG. 1, access controller 112 may include a processor 113, a memory 114 communicatively coupled to processor 113, storage media 116, a network interface 118 communicatively coupled to processor 113, and a power source 119 electrically coupled to processor 113. Processor 113 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102.

Memory 114 may be communicatively coupled to processor 113 and may include any system, device, or apparatus configured to retain program instructions and/or data for a period of time (e.g., computer-readable media). Memory 114 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off or power to access controller 112 is removed. Network interface 118 may include any suitable system, apparatus, or device operable to serve as an interface between access controller 112 and network 120. Network interface 118 may enable access controller 102 to communicate over network 120 using any suitable transmission protocol and/or standard, including without limitation all transmission protocols and/or standards enumerated below with respect to the discussion of network 120.

Power source 119 may include any system, device, or apparatus configured to and provide electrical energy to one or more components of access controller 112. In certain embodiments, power source 119 may include an alternating current (AC) or direct current (DC) source wherein electrical energy is provided from an electrical outlet (e.g., a 120-volt wall outlet). In certain embodiments, power source 119 may include a battery that stores electrochemical energy and provides electrical energy to one or more components of access controller 112. For example, power source 119 may be a rechargeable battery, meaning that its electrochemical energy may be restored by the application of electrical energy (e.g., a lead and sulfuric acid battery, nickel cadmium (NiCd) battery, nickel metal hydride (NiMH) battery, lithium ion (Li-ion) battery, lithium ion polymer (Li-ion polymer) battery, or any combination of the foregoing, or any other suitable battery). In operation, power source 119 may provide electrical energy to one or more electrical or electronic components (e.g., processor 113, memory 114, network interface 118) supplemental to or in lieu of a "main" power source of information handling system 102 (e.g., electrical power provided via an electrical outlet or a main system battery of information handling system 102).

Network 120 may be a network and/or fabric configured to communicatively couple information handling system 102, access controller 112, management server 122, content server 132, other information handling systems, and/or other networked components to each other. Network 120 may include a communication infrastructure, which provides physical connections, and a management layer, which organizes the physical connections, information handling system 102, access controller 112, management server 122, and content server 132. In the same or alternative embodiments, network 120 may allow block I/O services and/or file access services to network-attached computer-readable media.

Network 120 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 120 may transmit data using any storage and/or communication protocol, including without limitation, Fibre Channel, Frame Relay, Asynchronous Transfer Mode (ATM), Internet Protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 120 and its various components may be implemented using hardware, software, or any combination thereof.

Server 122 may comprise an information handling system and may generally be operable to receive data from and/or communicate data to one or more other information handling systems via network 120. In certain embodiments, server 122 may be configured to communicate data and/or instructions to information handling system 102 in order to manage, maintain, and/or control information handling system 102 and/or its various components, as discussed in greater detail elsewhere in this disclosure. In the same or alternative embodiments, server 122 may manage, maintain, and/or control information handling system 102 using one or more management-based protocols, such as simple network management protocol (SNMP) or Intelligent Platform Management Interface (IPMI), for example.

The information handling system 102 may include one or more components that process and/or operate based on firmware embedded in or near the device. For example, such components may include hard disk drives (HDDs), CD-ROM drives, and DVD drives, and/or various other devices and the like that include controllers driven by firmware. Firmware may be the program code embedded in a storage device and maintained within or near the device. The firmware for a component most often comprises the operational code for the component. More generally, firmware may include program code operable to control a plurality of information handling system 102 operations. Memory 104 and/or 114 may, for example, store firmware such as Dell's Embedded System Management firmware, remote access controller (RAC) firmware, and PowerEdge Expandable RAID Controller (PERC) firmware, a basic input/output system (BIOS) program, and/or device drivers such as network interface card (NIC) drivers. A BIOS program may include software that facilitates interaction with and between the information handling system 102 devices such as a keyboard (not expressly shown), a mouse (not expressly shown), and/or one or more I/O devices. A device driver may include program code operable to facilitate interaction of a hardware device with other aspects of information handling system 102.

From time to time, it may be necessary and/or desirable to update or upgrade the firmware of a component of the information handling system. For example, a firmware upgrade may be necessary to correct errors in, and/or improve the performance of, a device. The process of updating the firmware of a device is sometimes referred to as "flashing" the device, as the firmware update program will replace the software image stored in the flash memory with a second software image.

The updates may be implemented in various ways depending on a given system software environment. The software updates may be contained in packages, such as self-contained file, for distribution and deployment. In certain embodiments, an update package may contain one or more of the following components, which may be sets of files, for example.

An update package may contain an update package framework. This component may include files needed to run the update package while an operating system is running. Such files may not needed by an application conforming to the Unified Extensible Firmware Interface (UEFI) specification, an industry specification that defines a software interface between an operating system and firmware.

An update package may contain one or more update package inventory/update modules. These components may include files needed to inventory and update a device. Such files may not needed by an application conforming to the UEFI specification.

An update package may contain update package meta-data. This component may include files containing version information and release information such as iDrive release information. Meta-data which may be needed according to the UEFI specification may be present in the file such as a package.xml file. Such a file may be needed by an application conforming to the UEFI specification to upgrade and/or rollback a device.

An update package may contain an update package image (payload). This component may be the information (image or payload data) which the update package is carrying for a target device. The image may present under a "payload" folder inside the update package. The image may be in the form of one or more files with any number of sub-folders. This file may be needed by the UEFI application to upgrade and/or rollback a device. In some embodiments, the same image can support one or more different device upgrades and/or rollbacks. In order to support the rollback feature in the UEFI environment, a firmware image repository for all devices that can be updated in the UEFI environment may be required to be present in memory on a motherboard. The repository may only contain the update package image file(s) and the update package meta-data (i.e., it may not contain any update package framework or inventory/execute modules). When the system is shipped from the manufacturer, the repository may contain an installed version of all devices supported for update in the UEFI environment.

Updates may be installed with installers and/or other tools that work from within an operating system and may integrate update packages into a change management framework which may be used to manage an operating system. A software change management framework or system may comprise a collection of software programs to facilitate update installation, configuration and/or removal. To enable software change management systems to perform update and rollback functions for out-of-band change management, update packages may be supported with access controller 112. The update package may be a self-contained executable which can be run on an operating system to update BIOS, firmware or drivers on the system.

In certain embodiments, the processes may be automatic. In other embodiments, user intervention may be required. For example, a user may initiate an update package. The update package may perform an inventorying step for the device which it supports and then notify a user which version is installed on the information handling system and which version is present in the update package. A user can then continue with update execution to update the information handling system.

The processes involved in managing update changes may include the following steps: (1) inventorying the firmware and/or driver version or versions currently installed on the information handling system; (2) comparing the inventory with a defined set of update packages to determine which firmware and/or driver version(s) need to be updated; and (3) deploying changes to the firmware and/or driver version(s) needing to be updated using selected update packages. One important aspect of enabling the comparisons made in step (2) is to determine programmatically which update packages are applicable to what components of the information handling system as well as the version supercedence of the underlying software components, such as the firmware and/or drivers.

Another important aspect of the process is implementing update packages in for multiple devices in space-constrained and memory-constrained environments. In certain embodiments, memory 114 may store firmware that includes executable instructions to govern operation of access controller 112. Memory 114 may store firmware related to other components of information handling system 102. Memory 114 may be installed on a motherboard or a primary circuit board of information handling system 102. Memory 114, for example, may be flash memory that provides a small footprint and may be limited in the memory capacity.

Utilizing the update packages with a firmware image repository partition presents challenges regarding storage space, update and rollback for multiple devices. Such challenges include the need for: a small footprint; a unique directory structure for each device to store corresponding image file(s) and package.xml; correlating the device directory structure with the update package given that a single update package could support multiple devices; correlating device rollback with the device directory structure to support rollback; and efficiently locating the previous version of update packages to support rollback.

Certain embodiments of the present disclosure include a firmware image repository, where the image files and package.xml, for example, for each device are stored with one or more directories. Directories may be designated for the current installed update packages and previously installed update packages for rollback. For example, one directory may be designated as "current" and one directory may be designated as "previous." Under each directory, a component ID, which is unique to a device, may be concatenated to generate the directory name so that each directory name will correspond to a particular device. Embodiments of the present disclosure may include various algorithms cover initialization, update and rollback under various update/rollback situations.

FIG. 2 shows a process flow diagram illustrating initialization 200 for generating an initial directory structure. Initialization 200 may correspond to the factory installation of a given update package or the other application of a given update package for the first time. In step 210, a directory name is constructed by concatenating all component IDs supported by the update package. In step 220, a directory is created with the constructed name under the "current" directory. In step 230, payload files and package.xml copied and filed under the "current" directory. In step 240, the update is performed.

FIG. 3 shows a graphical view of file structure 300 for an exemplary firmware image repository directory before and after initialization 200. Prior to initialization 200, the existing file structure of firmware image repository is represented by directory 310 named "Firmware-Images." In this example, three component IDs are considered—component IDs A, B and C, which correspond to three components or devices supported by the update package. After initialization 200, the resulting file structure includes the directory 320 named "current," which has been created under directory 310, and directory 330 named "A-B-C," which has been created under directory 320. The name of directory 330 consists of the concatenated component IDs. The payload files and package.xml corresponding to component IDs A, B and C are stored under directory 330.

FIG. 4 shows a process flow diagram illustrating update 400 in accordance with certain embodiments of the present disclosure. Update 400 may correspond to a scenario where a current update package supports the same set of component IDs as a previous update package. In step 410, a directory name is constructed by concatenating all component IDs supported by the update package. In step 420, the same directory name is found under the current directory. In step 430, the matching directory under the current directory is moved to under the previous directory. In step 440, a directory with the constructed name is created under the current directory. In step 450, a payload files and package.xml are copied and stored under the current directory. In step 460, the update is performed.

FIG. 5 shows a graphical view of file structure 500 for an exemplary firmware image repository directory, where file structure 500 corresponds to update 400. Prior to update 400, the existing file structure of firmware image repository is represented by Firmware-Images 510, under which is directory 520 named "current," under which is directory 530 named "A-B-C." This example continues the consideration of the three component IDs A, B and C. After update 400, the resulting file structure further includes the directory 540 named "previous," which was created under Firmware-Images 510, and directory 550 named "A-B-C" has been created under directory 540. Again, the name of directory 550 consists of the concatenated component IDs, and the updated payload files and package.xml corresponding to component IDs A, B and C are stored under directory 550.

FIG. 6 shows a process flow diagram illustrating rollback 600 in accordance with certain embodiments of the present disclosure. Like update 400, rollback 600 may correspond to a scenario where a current update package supports the same set of component IDs as a previous update package. In step 610, an update package for rollback is identified by matching the component ID of the target device with directory name component under the previous directory. In step 620, the directory under the previous directory is identified. In step 630, the same directory name is found under the current directory. In step 640, the matching directory under the current directory is deleted. In step 650, the identified directory under the previous directory is moved to under the current directory. In step 660, the rollback is performed.

FIG. 7 shows a graphical view of file structure 700 for an exemplary firmware image repository directory, where file structure 700 corresponds to rollback 600. Prior to rollback 600, the existing file structure of firmware image repository corresponds to the resulting file structure after update 400. The existing file structure is represented by Firmware-Images 710, under which is directory 720 named "current," under which is directory 730 named "A-B-C." Also under Firmware-Images 710 is directory 740 name "previous," under which is directory 750 named "A-B-C." After rollback 600, the resulting file structure no longer includes the directory 740 and directory 750.

FIG. 8 shows a process flow diagram illustrating update 800 in accordance with certain embodiments of the present disclosure. In some situations, an exactly matching directory may not be available for update or rollback. In those situations, a related directory will need to be identified. A related directory may have at least one component ID in its directory name in common with the current update. For example, update 800 may correspond to a scenario where a current update package supports fewer component IDs than a previous update package used. In step 810, a directory name is constructed by concatenating all component IDs supported by the update package. In step 820, a directory under the current directory that is a superset of the new directory name is found. In step 830, the identified directory under the current directory is moved to under the previous directory. In step 840, a directory with the constructed name is created under the current directory. In step 850, payload files and package.xml are copied and stored under the newly created directory. In step 860, the update is performed.

FIG. 9 shows a graphical view of file structure 900 for an exemplary firmware image repository directory, where file structure 900 corresponds to update 800. Prior to update 800, the existing file structure of firmware image repository is represented by Firmware-Images 910, under which is directory 920 named "current," under which is directory 930 named "A-B-C." Update 800 consists of an update package that only supports component IDs B and C. After update 800, the resulting file structure further includes the directory 940 named "previous," which was created under Firmware-Images 910. Directory 950 named "A-B-C" has been moved to under directory 940. The resulting file structure further includes the directory 960 named "B-C," which was created under 920 named "current." Again, the name of directory 960 consists of the concatenated component IDs, and the updated payload files and package.xml corresponding to component IDs B and C are stored under directory 960.

FIG. 10 shows a process flow diagram illustrating rollback 1000 in accordance with certain embodiments of the present disclosure. Like update 800, rollback 1000 may correspond to a scenario where a current update package supports fewer component IDs than a previous update package used. In step 1010, a package to use for rollback is identified by matching the component ID of the target device with the directory name component under the previous directory. In step 1020, the directory under the previous directory is identified. In step 1030, a directory under the current directory that is subset of the identified directory is found. In step 1040, the superset directory under the current directory, as wells as the associated files, are deleted. In step 1050, the identified directory under the previous directory is moved to under the current directory. In step 1060, the rollback is performed.

FIG. 11 shows a graphical view of file structure 1100 for an exemplary firmware image repository directory, where file structure 1100 corresponds to rollback 1000. Prior to rollback 1000, the existing file structure of firmware image repository corresponds to the resulting file structure after update 800. The existing file structure is represented by Firmware-Images 1110, under which is directory 1120 named "current," under which is directory 1130 named "B-C." Also under Firmware-Images 1110 is directory 1140 named "previous," under which is directory 1150 named "A-B-C." After rollback 1000, the resulting file structure no longer includes the directory 1140 and directory 1150.

FIG. 12 shows a process flow diagram illustrating update 1200 in accordance with certain embodiments of the present disclosure. Update 1200 may correspond to a scenario where a current update package supports more component IDs than a previous update package used. In step 1210, a directory name is constructed by concatenating all component IDs supported by the update package. In step 1220, a directory is found, where the directory is under the current directory and where the directory is a subset of the new directory name. In step 1230, the identified directory under the current directory is moved to under the previous directory. In step 1240, a directory is created with the constructed name under the current directory. In step 1250, the payload files and package.xml are copied and stored under the newly created directory. In step 1260, the update is performed.

FIG. 13 shows a graphical view of file structure 1300 for an exemplary firmware image repository directory, where file structure 1300 corresponds to update 1200. Prior to update 1200, the existing file structure of firmware image repository is represented by directory 1310 named "Firmware-Images," under which is directory 1320 named "current," under which is directory 1330 named "A-B-C." Update 1200 consists of an update package that supports component IDs A, B and C, as well as D. After update 1200, the resulting file structure further includes the directory 1340 named "previous," which was created under directory 1310. Directory 1330 named "A-B-C" has been moved to under directory 1340. The resulting file structure further includes the directory 1350 named "A-B-C-D," which was created under directory 1320 named "current." The name of directory 1350 consists of the concatenated component IDs, and the updated payload files and package.xml corresponding to component IDs A, B, C and D are stored under directory 1350.

FIG. 14 shows a process flow diagram illustrating rollback 1400 in accordance with certain embodiments of the present disclosure. Like update 1200, rollback 1400 may correspond to a scenario where a current update package supports more component IDs than a previous update package used. In step 1410, a package is identified to use for rollback by matching component ID of the target device with directory name component under the previous directory. In step 1420, the directory under the previous directory is identified. In step 1430, a directory is found, where the directory is under the current directory and is a superset of the identified directory. In step 1440, the superset directory under the current directory is deleted. In step 1450, the identified directory under the previous directory is moved to under the current directory. In step 1460, the rollback is performed.

FIG. 15 shows a graphical view of file structure 1500 for an exemplary firmware image repository directory, where file structure 1500 corresponds to rollback 1400. Prior to rollback 1400, the existing file structure of firmware image repository corresponds to the resulting file structure after update 1200. The existing file structure is represented by directory 1510 named "Firmware-Images," under which is directory 1520 named "current," under which is directory 1530 named "A-B-C-D." Also under directory 1510 is directory 1540 named "previous," under which is directory 1550 named "A-B-C." After rollback 1400, the resulting file structure no longer includes the directory 1540 and directory 1550.

FIG. 16 shows a process flow diagram illustrating update 1600 in accordance with certain embodiments of the present disclosure. Update 1600 may correspond to a scenario where a current update package supports different component IDs than a previous update package used. In step 1610, a directory name is constructed by concatenating all component IDs supported by the update package. In step 1620, a directory is found under the current directory that has overlap with the new directory name. In step 1630, the identified directory under the current directory is moved to under the previous directory. In step 1640, directory is created with the constructed name under the current directory. In step 1650, payload files and package.xml are copied and stored under the newly created directory. In step 1660, the update is performed.

FIG. 17 shows a graphical view of file structure 1700 for an exemplary firmware image repository directory, where file structure 1700 corresponds to update 1600. Prior to update 1600, the existing file structure of firmware image repository is represented by directory 1710 named "Firmware-Images," under which is directory 1720 named "current," under which is directory 1730 named "A-B-C." Update 1600 consists of an update package that supports component IDs B, C and D. After update 1600, the resulting file structure further includes the directory 1740 named "previous," which was created under directory 1710. Directory 1730 named "A-B-C" has been moved to under directory 1740. The resulting file structure further includes the directory 1750 named "B-C-D," which was created under directory 1720 named "current." The name of directory 1750 consists of the concatenated component IDs, and the updated payload files and package.xml corresponding to component IDs B, C and D are stored under directory 1750.

FIG. 18 shows a process flow diagram illustrating rollback 1800 in accordance with certain embodiments of the present disclosure. Like update 1600, rollback 1800 may correspond to a scenario where a current update package supports different component IDs than a previous update package used. In step 1810, package is identified to use for rollback by matching component ID of the target device with directory name component under the previous directory. In step 1820, the directory under the previous directory is identified. In step 1830, a directory is found, where the directory is under the current directory and has overlap with of the identified directory. In step 1840, the superset directory under the current directory is deleted. In step 1850, the identified directory under the previous directory is moved to under the current directory. In step 1860, the rollback is performed.

FIG. 19 shows a graphical view of file structure 1900 for an exemplary firmware image repository directory, where file structure 1900 corresponds to rollback 1800. Prior to rollback 1800, the existing file structure of firmware image repository corresponds to the resulting file structure after update 1600. The existing file structure is represented by directory 1910 named "Firmware-Images," under which is directory 1920 named "current," under which is directory 1930 named "B-C-D." Also under directory 1910 is directory 1940 named "previous," under which is directory 1950 named "A-B-C." After rollback 1800, the resulting file structure no longer includes the directory 1930 and directory 1940, and directory 1950 is stored under directory 1920.

Thus, the present invention provides a complete solution to performing firmware updates and rollbacks for multiple devices in environments where resources such as space and memory are constrained. The present invention provides an efficient mechanism for managing updates and rollbacks that may vary from component to component and from vendor to vendor. The present invention discloses a unique directory structure that enables use of memory/storage with a small footprint. The present invention enabling correlation of a device directory structure with the update package when a single update package could support multiple devices, correlation of device rollback with the device directory structure to support rollback, and efficient location of previous versions of update packages to support rollback. Other technical advantages will be apparent to those of ordinary skill in the art in view of the specification, claims and drawings.

Although the present disclosure has been described in detail, it should be understood that various changes, substitutions, and alterations can be made hereto without departing from the spirit and the scope of the invention as defined by the appended claims. Various changes, substitutions, and alterations can be made to interfaces with multiple devices at one end and a single device at the other end without departing from the spirit and the scope of the invention.

What is claimed is:

1. A method for modifying firmware of an information handling system having a non-transitory, computer readable storage medium, the method comprising:
   receiving a firmware package at a processor of the information handling system, wherein the processor is coupled to the computer readable storage medium, wherein the firmware package comprises firmware information for a set of components in the information handling system;
   determining at the processor one or more relationships between the firmware package and at least one of the set of components;
   generating a first storage partition identifier based, at least in part, on the one or more relationships;
   generating a second storage partition identifier based, at least in part, on one or more parameters of each component, wherein the second storage partition identifier is associated with the first storage partition identifier;
   generating a first storage partition on the computer readable storage medium, wherein the first storage partition identifier identifies the first storage partition;
   generating a second storage partition on the computer readable storage medium, wherein the second storage partition identifier identifies the second storage partition;
   storing a copy of the firmware information on the computer readable storage medium so that the firmware information is associated with the second storage partition;
   modifying firmware for at least one of the set of components based, at least in part, on the firmware information;
   receiving a second firmware package, wherein the second firmware package comprises updated firmware information for a second set of components in the information handling system;
   determining one or more relationships between the second firmware package and at least one of the second set of components;
   generating a third storage partition identifier based, at least in part, on one or more parameters of each of the second set of components;
   determining whether the third storage partition identifier relates to a previously generated storage partition identifier;
   wherein the determining whether the third storage partition identifier relates to a previously generated storage partition identifier further comprises comparing the third storage partition identifier with the second storage partition identifier; and
   if the third storage partition identifier relates to the second storage partition identifier:
      generating a fourth storage partition identifier based, at least in part, on the one or more relationships between the second firmware package and at least one of the second set of components;
      generating a fourth storage partition on the computer readable medium, wherein the fourth storage partition identifier identifies the fourth storage partition;
      associating the second storage partition identifier with the fourth storage partition identifier;
      storing a copy of the updated firmware information on the computer readable medium so that the updated firmware information is associated with the second storage partition; and
      modifying firmware for at least one of the second set of components based, at least in part, on the updated firmware information.

2. The method of claim 1, wherein the method further comprises:
   receiving a third firmware package;
   identifying the third firmware package to use for rollback of firmware for a target component; and
   determining whether the target component relates to a previously generated storage partition identifier.

3. The method of claim 2, wherein the target component relates to the second storage partition identifier.

4. The method of claim 3, wherein the method further comprises:
   deleting the third storage partition identifier;
   associating the second storage partition identifier with the first storage partition identifier; and
   modifying firmware for at the target component based, at least in part, on the firmware information associated with the second storage partition identifier.

5. A non-transitory, computer readable storage medium comprising executable instructions to cause at least one processor coupled to the computer readable storage medium to:
   determine one or more relationships between a firmware package and a set of components in the information handling system, wherein the firmware package comprises firmware information for the set of components;
   generate a first storage partition identifier based, at least in part, on the one or more relationships;

generate a second storage partition identifier based, at least in part, on one or more parameters of each component, wherein the second storage partition identifier is associated with the first storage partition identifier;
generate a first storage partition within a firmware image repository, wherein the first storage partition identifier identifies the first storage partition;
generate a second storage partition within the firmware image repository, wherein the second storage partition identifier identifies the second storage partition;
store a copy of the firmware information within the firmware image repository so that the firmware information is associated with the second storage partition;
modify firmware for at least one of the set of components based, at least in part, on the firmware information;
determine one or more relationships between a second firmware package and a second set of components in the information handling system, wherein the second firmware package comprises updated firmware information;
generate a third storage partition identifier based, at least in part, on one or more parameters of the second set of components;
determine whether the third storage partition identifier relates to a previously generated storage partition identifier;
compare the third storage partition identifier with the second storage partition identifier; and
if the third storage partition identifier relates to the second storage partition identifier:
 generate a fourth storage partition identifier based, at least in part, on the one or more relationships between the second firmware package and the second set of components;
 generate a fourth storage partition having the fourth storage partition identifier;
 associate the second storage partition identifier with the fourth storage partition identifier;
 store a copy of the updated firmware information so that the updated firmware information is associated with the second storage partition; and
 modify firmware for at least one of the second set of components based, at least in part, on the updated firmware information.

6. The computer program of claim 5, wherein the computer program further comprises executable instructions to cause the at least one processor to:
 identify a third firmware package to use for rollback of firmware for a target component; and
 determine whether the target component relates to a previously generated storage partition identifier.

7. The computer program of claim 6, wherein the target component relates to the second storage partition identifier.

8. The computer program of claim 7, wherein the computer program further comprises executable instructions to cause the at least one processor to:
 delete the third storage partition identifier;
 associate the second storage partition identifier with the first storage partition identifier; and
 modify firmware for at the target component based, at least in part, on the firmware information associated with the second storage partition identifier.

9. An information handling system, comprising:
at least one processor;
a non-transitory, computer readable storage medium coupled to the at least one processor, wherein the non-transitory, computer readable storage medium comprises instructions that cause the at least one processor to:
 determine one or more relationships between a firmware package and a set of components associated with the information handling system, wherein the firmware package comprises firmware information;
 generate a first storage partition identifier based, at least in part, on the one or more relationships;
 generate a second storage partition identifier based, at least in part, on one or more parameters of the set of components, wherein the second storage partition identifier is associated with the first storage partition identifier;
 generate a first storage partition within a firmware image repository coupled to the at least one processor, wherein the first storage partition identifier identifies the first storage partition;
 generate a second storage partition within the firmware image repository, wherein the second storage partition identifier identifies the second storage partition;
 store a copy of the firmware information within the firmware image repository so that the firmware information is associated with the second storage partition;
 modify firmware for at least one of the set of components based, at least in part, on the firmware information;
 determine one or more relationships between a second firmware package and a second set of components associated with the information handling system, wherein the second firmware package comprises updated firmware information;
 generate a third storage partition identifier based, at least in part, on one or more parameters of the second set of components;
 determine whether the third storage partition identifier relates to a previously generated storage partition identifier;
 compare the third storage partition identifier with the second storage partition identifier; and
 if the third storage partition identifier relates to the second storage partition identifier:
  generate a fourth storage partition identifier based, at least in part, on the one or more relationships between the second firmware package and the second set of components;
  generate a fourth storage partition having the fourth storage partition identifier;
  associate the second storage partition identifier with the fourth storage partition identifier;
  store a copy of the updated firmware information so that the updated firmware information is associated with the second storage partition; and
  modify firmware for at least one of the second set of components based, at least in part, on the updated firmware information.

10. The information handling system of claim 9, where the instructions further cause the at least one processor to:
 identify a third firmware package to use for rollback of firmware for a target component; and determine whether the target component relates to the second storage partition identifier.

11. The information handling system of claim 10, where the instructions further cause the at least one processor to:
 delete the third storage partition identifier;
 associate the second storage partition identifier with the first storage partition identifier; and
 modify firmware for at the target component based, at least in part, on the firmware information associated with the second storage partition identifier.

* * * * *